United States Patent Office 3,626,705
Patented Dec. 14, 1971

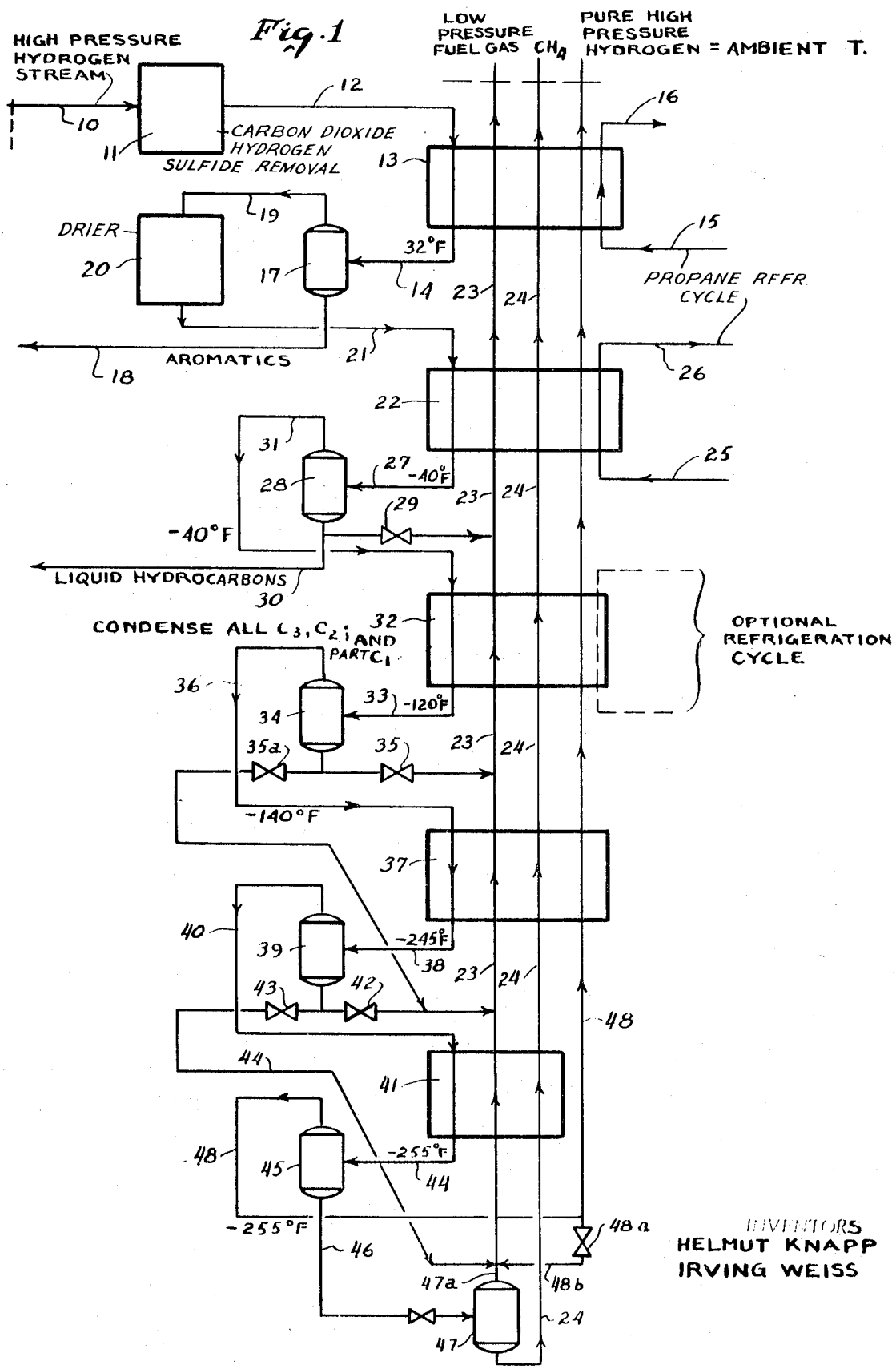

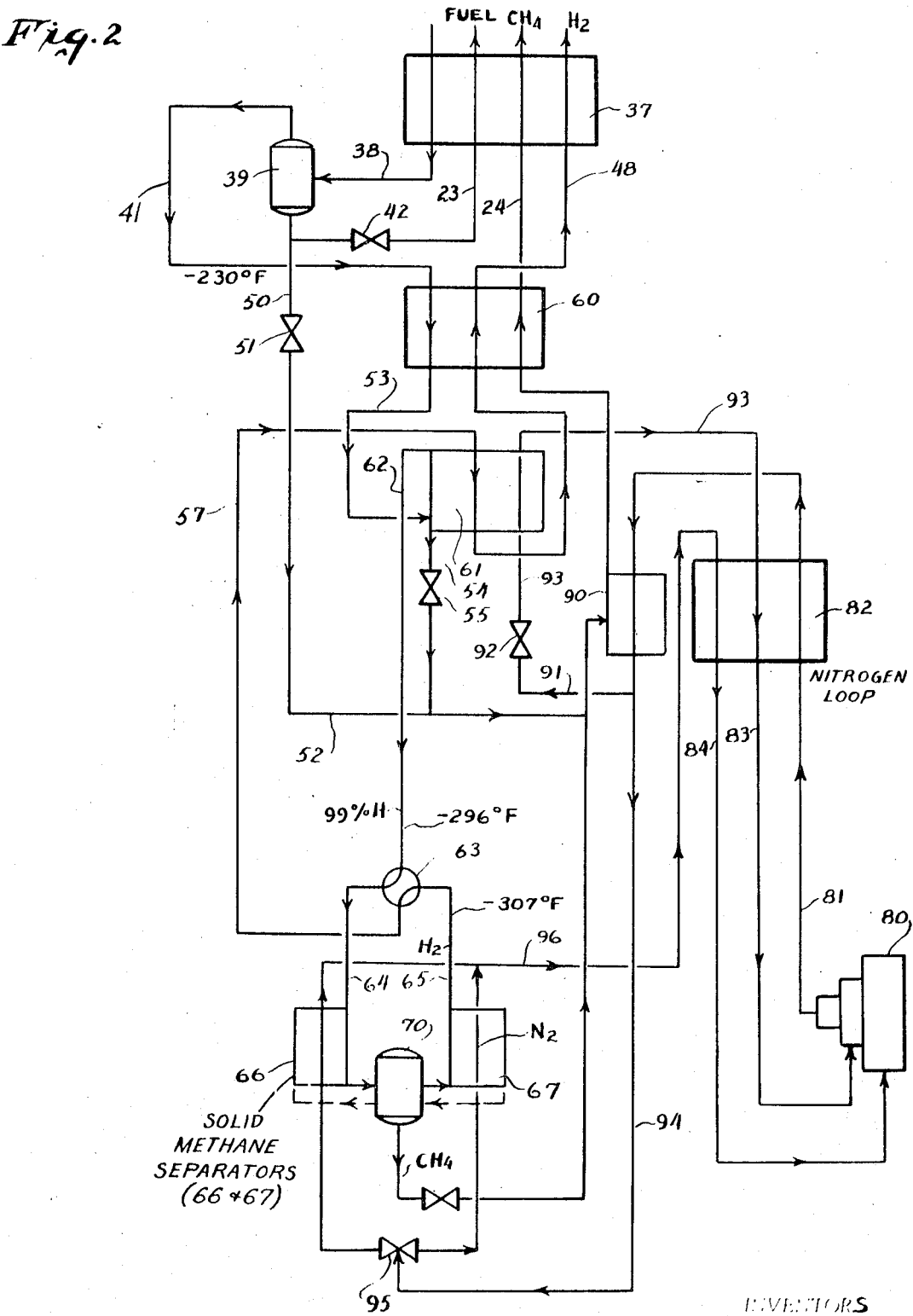

3,626,705
LOW TEMPERATURE SEPARATION OF GASEOUS MIXTURES EMPLOYING SOLIDIFICATION
Helmut Knapp, Massenheim, Germany, and Irving Weiss, Brooklyn, N.Y., assignors to Messer Griesheim G.m.b.H., Frankfurt am Main, Germany
Continuation of applications Ser. No. 386,595, July 31, 1964, and Ser. No. 624,621, Mar. 20, 1967. This application Sept. 4, 1968, Ser. No. 785,831
Int. Cl. F25j 1/02, 3/06
U.S. Cl. 62—23         3 Claims

ABSTRACT OF THE DISCLOSURE

A process for recovering hydrogen from a refinery off gas by progressive reduction in temperature of the gas and successive removal of respective contaminants therefrom by condensation thereof. At least some of the condensed contaminants are expanded and employed as a refrigerating fluid in the process. Methane which precipitates out as solid in the final stage of heat exchange is removed in an alternating exchanger purge arrangement. In a hydrogen purification system, a portion of the purified hydrogen is mixed with the condensed hydrocarbons separated from the crude hydrogen and this mixture is used to cool the crude hydrogen to be purified.

---

The present application constitutes a continuation of U.S. patent application Ser. No. 624,621, filed Mar. 20, 1967, as a continuation of U.S. patent application Ser. No. 386,595, filed July 31, 1964, now abandoned.

BACKGROUND OF THE INVENTION

This invention relates to a process for the separation of a gaseous mixture using low temperature fractionations. It relates more specifically to the production of high purity hydrogen by separating it from a mixture of hydrogen and hydrocarbons, by applying the technique of condensation, fractionation and solidification. The invention also relates to manipulation of the process for the recovery of various pure hydrocarbon fractions simultaneously with the production of the pure hydrogen.

In oil refinery operations large quantities of hydrogen-containing off-gases are generated in reforming processes. The hydrogen concentration in these off-gases can vary between about 30 to 85%. There are other processes such as hydro-treating, hydro-cracking, hydro-dealkylation, or hydrogenation, which consume large quantities of relatively pure hydrogen. There are also recycle operations in which hydrogen is passed through a reaction zone where other components are admixed with the hydrogen. These components have to be removed before the hydrogen can be re-used in the recycle.

SUMMARY OF THE INVENTION

It is a basic object of this invention to provide a process for treating refinery off-gases and recycle streams in order to improve the operating conditions by increasing the concentration and therefore the partial pressure of the hydrogen and/or in order to reduce inert vents and/or prolong catalyst life by removing undesirable components.

It is therefore another object of this invention to provide a process for producing a hydrogen stream containing about 93% minimum hydrogen from refinery off-gas, recovering at least about 98% of the hydrogen contained in the feed gas and delivering the hydrogen stream at a pressure only slightly lower than the pressure of the feed gas.

It is another object to provide manipulations of the process for the recovery of other hydrocarbons as pure fractions.

Accordingly, the invention is concerned with a process for the treatment of a refinery off-gas hydrogen stream wherein the higher boiling hydrocarbons are subjected to a sequence of fractional condensations all in an atmosphere of hydrogen so that water, aromatic fractions, aliphatic fractions, etc. are removed from the product stream, thereby to give a vapor which is hydrogen of a very high degree of purity and the hydrocarbons suitable for withdrawal as a liquid or to be recycled to a heating operation. This process, therefore, is embodied in the method of operation and combination of apparatus to form a system for separating pure hydrogen from a stream of off-gas, the operation involving the combinations of steps and units of equipment which characterize the process and plant involved in the separation of various components from the hydrogen stream.

In particular, the process is characterized by the fact that where the starting gas contains about 2 mols or less of hydrogen per mol of the total hydrocarbon, it will operate without auxiliary refrigeration.

For the better understanding of the system and process it is useful to trace in detail two specific processes or applications of the process.

DESCRIPTION OF THE PREFERRED EMBODIMENT.—FIG. 1

In FIG. 1 a schematic flow diagram of a purification system for the production of hydrogen with a concentration of 94% is presented. The gas to be separated is, for example, a mixture of the return stream of a dealkylation unit in an aromatics plant and the off-gas of a reformer and could have the following composition:

| | Percent |
|---|---|
| Hydrogen | 40–65 |
| Methane | 20–35 |
| Ethane | 5–15 |
| Propane | 3–10 |
| Butanes and heavier | 0–5 |
| Aromatics such as benzene, toluene, xylene | 0–5 |

The gas is available at a pressure of 400–600 p.s.i.g. absolute and a temperature of 100° F. and contains small amounts of $H_2S$, $CO_2$ and $H_2O$. At these high pressures the 14.7 pounds per square inch difference between the absolute and gauge pressure levels is not significant. The feed gas delivered through line 10 is first cleaned in a conventional scrubbing step in tower 11 to remove $CO_2$ and $H_2S$ and is then passed through line 12 through heat exchanger 13 where it is cooled to the temperature of beginning of hydrocarbon hydrate formation, or freezing of water, whichever is higher, countercurrent to the effluent streams.

A major portion of the $H_2O$, a major portion of the aromatics and some of the heavier aliphatic hydrocarbons condense in heat exchanger 13; liquid propane supplied from an external refrigeration system is passed through line 15 into heat exchanger 13 and removed through line 16. Evaporation of the propane in heat exchanger 13 is to supply refrigeration required for the condensation. The feed leaving heat exchanger 13 is introduced into phase separator 17, where the liquid aromatics fraction is collected and withdrawn through line 18. The vapor fraction passes through line 19 to a drier system 20 where residual $H_2O$ is removed by adsorption on a suitable desiccant.

The dry gas leaving the drier through line 21 is cooled further in heat exchanger 22 to approximately —40° F., passing countercurrent to the ultimate effluent streams of the total system in the lines 23–24 and 48. The small portion of the remaining aromatics and the heavier hydrocarbons, i.e. most of the $C_4$ and some $C_3$, will condense in heat exchanger 22. More liquid propane supplied from an external refrigeration system is passed through line 25, into the exchanger, to supply additional refrigeration, and recovered thru line 26. The feed gas leaving heat exchanger 22 is introduced via line 27 into phase separator 28 where the liquid fraction is collected and either withdrawn via line 30 as a liquid hydrocarbon product or expanded through valve 29 into the returning low pressure fuel gas stream 23. In the latter case the liquid hydrocarbon will evaporate in heat exchanger 22 and heat exchanger 13 and reduce the requirements for external propane refrigeration. The vapor phase from separator 28 passing through line 31 is further cooled to approximately −120° F. in heat exchanger 32 flowing countercurrent to the effluent streams. In heat exchanger 32 practically all $C_3$ and most of $C_2$ will condense, together with some $CH_4$. The feed leaving heat exchanger 32 via line 33 is introduced into phase separator 34 where the liquid fraction is collected and expanded via valve 35 into the returning fuel gas stream 23. Bleed valve 35a is also provided to permit diverting part of the liquid to the low pressure fuel line after the next stage of heat exchange. This aids in temperature control in heat exchanger 37. The return of liquid to the fuel gas stream causes it to evaporate in heat exchanger 32 (or 37) supplying necessary refrigeration for the cooling and partial condensation of the feed.

The vapor phase from separator 34 is carried by line 36 and further cooled in heat exchanger 37 to −220 to −245° F. flowing countercurrent to the effluent streams. The temperature chosen at this heat exchanger is such that the remaining methane and ethane in the vapor phase leaving via line 38 to separator 39, will at final separator 47 give the required quantity and purity of the methane product fraction.

The mixture leaving heat exchanger 37 via line 38 is introduced into separator 39 where the liquid fraction is collected. One part is expanded into the returning fuel gas passage 23 via valve 42; another part is expanded into heat exchanger 41 via valve 43, line 44, supplying additional refrigeration. The vapor phase from separator 39, brought by line 40, is cooled finally in heat exchanger 41 to approximately −255° F. countercurrent to evaporating methane. The mixture leaving heat exchanger 41 via line 44 is introduced into phase a separator 45. The condensed methane is separator 45 is collected, passed via line 46, and expanded into phase separator 47 to flash off the dissolved hydrogen. The pure liquid methane product is returned through heat exchanger 41, via line 24, where it evaporates and then through the entire heat exchange system where it is warmed. Additional refrigeration for heat exchanger 41 is provided by evaporating part of the liquid from separator 39 in heat exchanger 41. Hydrogen vapor from separator 47 via line 47a and from the hydrogen product via valve 48a and line 48b are added to this liquid to lower the vaporization temperature and to allow cooling of the $H_2$-$CH_4$ mixture in heat exchanger 41 to a lower temperature approximately −255° F. At this temperature the vapor from separator 45 will contain hydrogen of higher than 92% purity. This is passed to line 48. The hydrogen product is returned via line 48 through heat exchangers 37, 32, 22, and 13, where it is warmed, providing refrigeration for the cooling of the entering gas.

The liquids from separators 34, 39, and 45 are returned to the heat exchange system, evaporated and warmed, thereby offering refrigeration to the entering gas.

This fuel gas stream can be withdrawn at some pressure higher than atmospheric pressure to reduce the power requirements in case it has to be introduced into a fuel gas system maintained at some elevated pressure. The fuel gas delivered after heat exchanger 13, at low pressure, consists of hydrocarbons added to the line at various stages together with a small amount of hydrogen from separator 47.

FIG. 2

FIG. 2 represents the final section of a hydrogen concentration unit producing hydrogen of a purity higher than 99%. It is assumed that the feed gas has been cooled to −220 to −240° F. in a system, like the one described in FIG. 1, before it enters heat exchanger 37. To emphasize correspondence heat exchanger 37 and separator 39 may be assumed to be the end of a system just like that of FIG. 1 which precedes heat exchanger 37 and separator 39.

The stream leaving heat exchanger 37 via line 38 is introduced into phase separator 39 where the liquid hydrocarbon fraction is collected. One part of the liquid fraction expanded through valve 42 into line 23 in the cold end of heat exchanger 37 where it evaporates, warms, and is combined with the fuel gas fractions from previous stage separator 34 and possibly separator 28. Another part of the liquid condensate is reduced to a lower level, transferred via line 50 and valve 51 and combined via line 52 with the liquid methane fraction condensed in heat exchanger 60 and 61 and heat exchanger 66 or 67. The vapor fraction from separator 39 is further cooled, transferred via line 41 and condensed in heat exchanger 60, flowing countercurrent to the effluent hydrogen product and methane product. The liquid-vapor mixture leaving heat exchanger 60 is then introduced via line 53 into the warn end of reflux heat exchanger 61. It is cooled when rising in this heat exchanger. Condensing hydrocarbons will flow down to the bottom of the heat exchanger 61 where they accumulate together with the liquid fraction transferred from heat exchanger 60. The liquid fraction is withdrawn via line 54 and valve 55 and combined with a portion of the liquid from separator 39 and with the liquid methane from separator 70. Refrigeration for heat exchanger 61 is supplied by the returning hydrogen product stream via line 57 and by evaporating nitrogen supplied via a separate nitrogen loop.

The pressure of the nitrogen is controlled in such a way that the lowest temperature reached in heat exchanger 61 cools the incoming gas to a temperature just above the freezing point of the methane contained in the incoming stream. The hydrogen vapor leaving the cold end of heat exchanger 61 via line 62, containing approximately 1% methane, is then directed by a four-way valve 63 via lines 64 and 65 into one of the two freeze-out heat exchangers, 66 and 67, respectively. It will first pass through the warm branch, melting methane that had been frozen out in this branch on the previous cycle. The liquid methane is carried out and collected when the gas passes through separator 70. The gas leaving separator 70 is cooled in the cold branch of the freezout heat exchanger system by nitrogen evaporating at atmospheric or subatmospheric pressure. During the cooling more methane will be separated from the hydrogen by freezing. The pure hydrogen leaving the cold end of the freezout heat exchanger is then directed by the four-way valve 63 to heat exchangers 61, 60, 37, etc. where it is warmed before leaving the plant as hydrogen product.

A nitrogen cycle loop serves as a cascade cycle to transfer refrigeration from the temperature level of boiling methane approximately −260° F., to lower temperatures where the refrigeration is used to condense and freeze out more methane from the hydrogen stream. The nitrogen is compressed in the recycle compressor 80 to approximately 360 p.s.i.g., transferred via line 81, cooled in heat exchanger 82 countercurrent to the effluent low pressure nitrogen streams 83–84. The nitrogen leaves heat exchanger 82 at a temperature close to its saturation point and is then liquified in condenser 90 against evaporating methane. One part of the liquid nitrogen is then expanded thru line 91 and valve 92 and line 93 into heat exchanger 61 where it evaporates at approximately 30 p.s.i.g. supplying refrigeration required for the cooling and partial condensation of the feed. Another part of the liquid nitrogen is expanded through line 94 and a three-way valve 95 into the cold branch of the freezeout heat exchanger system, 66 and 67. The cold nitrogen vapors from heat exchangers 66 and 67 are brought via line 96 and warmed in heat exchanger 82 and returned to the recycle compressor.

In recapitulation, it should be noted that the process for fractionating the hydrogen off-gas stream is characterized by its being a high pressure operation in which the total off-gas stream enters the system for recovery at a very high pressure, on the order of 400–600 pounds per square inch absolute, and the hydrogen is delivered at the discharge point of the system at substantially the same pressure. The hydrocarbon by-products separated from the hydrogen stream are delivered separately at about atmospheric pressure, and a low pressure methane stream, also at substantially atmospheric pressure. These enter the recovery system at the same pressure level as the hydrogen. The difference in the heat content of these two separate streams, or their total enthalpy, at high pressure and as separate components at low pressure is virtually the net quantity of energy used in the system to accomplish the separation and to move the gases therethrough. That is, it operates at a heat balance which is auto-refrigerating when the entering mixture of gases contains a maximum of 65% hydrogen with the rest of the gas 35% hydrocarbon. The system is operable with larger proportions of hydrogen but extra refrigeration must be supplied through external means. Thus, in the operation of the process, the total heat content available by reducing the pressure on the hydrocarbon fraction in the process of separating it from the hydrogen, is sufficient to make auto-refrigeration with no significant heat taken in or out when the hydrogen content is about 65%. When the hydrogen content is higher, a small amount of refrigeration can be added and this is indicated in the diagram of FIG. 1 by showing that the heat exchanger 32 may use, for example, an ethylene coil at this stage.

In the typical operation of the process, therefore, the hydrogen enters through line 10 at 400–600 pounds per square inch absolute. Low pressure fuel gas consisting of hydrocarbons from the system becomes available from line 23 at substantially atmospheric pressure. Low pressure methane is available substantially at atmospheric pressure at line 24. Because methane is a gas which liquifies at a lower temperature it is made separately available. Because of its properties, it is useful in chemical processing and, for this reason also, it is separately formed.

Hydrogen enters the system as indicated at line 10 at 400–600 pounds per square inch and leaves the system at line 48 at substantially the entering pressure. It passes through the heat exchangers successively, 47, 32, 31 and 13, adding to the refrigeration at each of these stages and thus leaves at a temperature of the order of magnitude of zero to ambient temperature.

The process is characterized by its having at least five stages of separation and cooling of gas fractions, the first being concerned with water and aromatics, the second with liquid hydrocarbon, the third with liquid hydrocarbon and methane, the fourth and fifth with methane. At the first stage of cooling, the temperature is kept at about 32° F.–45° F. to remove water and avoid hydrocarbon hydrate formation. At the second stage of cooling, the gas stream is approximately —40° F. At the third stage of cooling, following condensation of the $C_2$ and $C_3$ hydrocarbons, the temperature of the gas stream is about —140° F. At the fourth stage of cooling, the methane fractions being removed and the last traces of heavier hydrocarbons being removed, the temperature of the gas stream is of the order of —220–245° F., and in the final stage of operation, where the methane is liquified, the temperature is —255° F.

In the alternative operation as outlined in FIG. 2, the temperature of the mixture at the four-way valve, or in the line approaching the four-way valve, is about —296° F. The material leaving the dual methane separators at this stage is at a temperature of —315° F.

It is to be understood that these temperatures and conditions are specifically noted in the process described in FIGS. 1 and 2 are typical ranges for guidance in the process specified in Example 1. Should the gas be richer in hydrogen, these temperatures will be slightly higher. Should the gas be of a lower hydrogen content, these temperatures will be slightly lower. They may be considered median for gases of a median composition shown in Example 1.

In the diagrams a common conventional symbol is used to orient flow of gas, i.e., the arrowhead shows direction; the line passing through a heat exchanger represents an internal coil; and the line aligned with a side of a heat exchanger represents entry into the shell side of the exchanger.

It should be noted that the aromatics are recoverable directly as liquid, this being shown at line 18 in FIG. 1. Should it be desired, it is possible to provide a branch line from 18 to line 23 to permit flashing of aromatic fractions to another low pressure line passing through heat exchanger 13. That is, part of the aromatics can be reclaimed as impure material, the rest being recovered as liquid through line 18. The step consitutes flashing paraffins therefrom and, in this sense, providing an enriched fuel gas.

A similar step is expressly shown in connection with separator 28 wherein the optional line 29 provides for flashing part of the liquid hydrocarbon into the fuel line.

At the final stages of the process, namely, separator 47, likewise, a certain amount of product hydrogen is fed by way of line 48b into the separator to flash out of the liquid methane any residual hydrogen which is then fed to fuel gas by way of line 24.

What is claimed is:
1. The method of purifying a hydrogen stream, the said stream containing hydrogen in marginally recoverable amounts to proportions as high as 85%, which comprises receiving the gas at starting pressure above about 400 pounds per square inch absolute, and with a hydrogen content below 65%, passing the hydrogen stream through a system, wherein the hydrogen carries various gaseous accompanying components of the said stream through the system, and the process, subjecting the gas stream to a sequence of fractional condensations and separations, while maintaining it substantially at starting pressure, comprising, first treating the gas stream to remove contaminants which would freeze solid at low temperatures, and thereafter, by auto-refrigeration, cooling the entire gas stream to a temperature below about 45–50° F., and separating therefrom any aromatic hydrocarbon condensate and other condensate, cooling the gas stream further to a temperature approximating —40° F., thereby to liquefy and separate $C_3$ hydrocarbons, passing the gas stream to a further cooling stage and cooling it to a temperature approximating —140° F. and separating therefrom $C_1$–$C_2$ and residual $C_3$ hydrocarbons, passing said gas stream to a further cooling stage and reducing its temperature to a level approximating —235° F. and separating therefrom further condensate and, thereafter, cooling the gas stream to a temperature below —255° F. to form a cold hydrogen vapor, substantially of hydrogen, and to liquefy methane, and separating said hydrogen vapor from liquid methane, in said auto-refrigeration, expanding said separated hydrocarbon streams into zones of low pressure in heat exchange relation with the main gas stream and recovering the hydrocarbons as low pressure gas, the enthalpy difference between the entering hydrocarbons of the gas stream and the hydrocarbons leaving the process being substantially sufficient for autorefrigeration in cooling stages of the gas below the lowest temperature of withdrawal of liquid fractions, whereby said hydrogen stream of a concentration greater than 99% is produced, and cooling the hydrogen stream to a temperature below the solidification temperature of methane and removing hydrocarbons from said hydrogen by freezing in a dual zone, and recovering latent heat of melting in one zone during the derime cycle.

2. A hydrogen purification system for separating gaseous hydrocarbons and minor impurities from a crude hydrogen stream comprising: an adsorber system for removing said minor impurities from said crude hydrogen stream, a heat exchanger having first, second and third passages in heat exchange relationship, means for introducing said crude hydrogen stream from said adsorber system into said first heat exchanger passage for cooling said crude hydrogen stream and condensing hydrocarbons therefrom, phase separator means connected to said first heat exchanger passage for separating said condensed hydrocarbons from the resulting hydrogen enriched gaseous stream, passage means for injecting said condensed hydrocarbons into said second heat exchanger passage, expansion means in said last recited passage means for expanding said condensed hydrocarbons to a lower temperature before injection thereof into said second heat exchanger passage wherein said low temperature condensed hydrocarbons are vaporized in cooling said crude stream in said first heat exchanger passage, passage means for passing a portion of said enriched hydrogen stream from said separator through said third heat exchanger passage to warm said enriched hydrogen stream, passage means for withdrawing warmed enriched hydrogen as a product stream, and by-pass passage means for passing a portion of said enriched hydrogen stream from said separator through said second heat exchanger passage for reducing the partial pressure and lowering the temperature of the hydrocarbons in said second passage thereby producing greater hydrocarbon condensation from the crude hydrogen stream in the first heat exchanger passage and higher product hydrogen purity.

3. The hydrogen purification system as claimed in claim 4 wherein said by-pass passage includes flow control means for the enriched hydrogen passed into said second heat exchanger passage thereby controlling the product hydrogen purity.

References Cited

UNITED STATES PATENTS

| | | | |
|---|---|---|---|
| 3,026,683 | 3/1962 | Palazzo et al. | 62—23 |
| 3,062,015 | 11/1962 | Cost | 62—23 |
| 3,212,277 | 10/1965 | Harper et al. | 62—23 |
| 3,218,816 | 11/1965 | Grenier | 62—23 |
| 3,363,428 | 1/1968 | Charlesworth | 62—23 |

OTHER REFERENCES

Progress in Refrigeration Science and Technology, vol. 1, Pergamon Press, 1960, pp. 34–39.

NORMAN YULKOFF, Primary Examiner

A. F. PURCELL, Assistant Examiner

U.S. Cl. X.R.

62—11, 23, 12

UNITED STATES PATENT OFFICE
CERTIFICATE OF CORRECTION

Patent No. 3,626,705        Dated December 14, 1971

Inventor(s) Helmut Knapp et al

It is certified that error appears in the above-identified patent and that said Letters Patent are hereby corrected as shown below:

Column 3, line 44, "a" should be deleted; line 45, "methane is" should read -- methane in --.
Column 4, line 11, "expanded" should read -- is expanded --; line 24, "warn" should read -- warm --.
Column 6, line 43, "and the" should read -- and in the --.
Column 7, line 12, "and minor impurities" should be deleted; line 13, "an adsorber system for" should be deleted; line 14, should be deleted entirely; line 15, "drogen stream, a" should be deleted; line 17, "from said" should be deleted; line 18, "adsorber system" should be deleted.
Column 8, line 1, "stream." should read -- stream, --; line 11, "4" should read -- 2 --.

Signed and sealed this 26th day of September 1972.

(SEAL)
Attest:

EDWARD M. FLETCHER, JR.
Attesting Officer

ROBERT GOTTSCHALK
Commissioner of Patents